(12) United States Patent
Frojdh et al.

(10) Patent No.: US 7,979,886 B2
(45) Date of Patent: Jul. 12, 2011

(54) CONTAINER FORMAT FOR MULTIMEDIA PRESENTATIONS (75) Inventors: Per Frojdh, Stockholm (SE); Torbjorn Einarsson, Stockholm (SE); Magnus Westerlund, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1034 days.

(21) Appl. No.: 10/963,771

(22) Filed: Oct. 14, 2004

(65) Prior Publication Data

US 2005/0086582 A1    Apr. 21, 2005

Related U.S. Application Data

(60) Provisional application No. 60/511,694, filed on Oct. 17, 2003.

(51) Int. Cl.
*H04N 7/16* (2011.01)
(52) U.S. Cl. ........................... 725/135; 709/231
(58) Field of Classification Search .............. 725/135
See application file for complete search history.

(56) References Cited

U.S. PATENT DOCUMENTS

| | | | | |
|---|---|---|---|---|
| 6,098,126 | A * | 8/2000 | Batson et al. | 710/58 |
| 6,430,177 | B1 | 8/2002 | Luzeski et al. | |
| 6,792,433 | B2 * | 9/2004 | Cornog et al. | 707/104.1 |
| 7,246,318 | B2 * | 7/2007 | Debique et al. | 715/734 |
| 7,296,063 | B2 * | 11/2007 | Levi et al. | 709/217 |
| 2002/0026521 | A1 * | 2/2002 | Sharfman et al. | 709/231 |
| 2003/0050919 | A1 * | 3/2003 | Brown et al. | 707/2 |
| 2003/0053416 | A1 | 3/2003 | Ribas-Corbera et al. | |
| 2003/0061369 | A1 | 3/2003 | Aksu et al. | |
| 2004/0001106 | A1 * | 1/2004 | Deutscher et al. | 345/838 |
| 2004/0190606 | A1 * | 9/2004 | Deshpande | 375/240.01 |
| 2005/0004997 | A1 * | 1/2005 | Balcisoy et al. | 709/219 |
| 2005/0071744 | A1 * | 3/2005 | Dunbar et al. | 715/500.1 |
| 2005/0102371 | A1 * | 5/2005 | Aksu | 709/217 |
| 2006/0256130 | A1 * | 11/2006 | Gonzalez | 345/619 |
| 2008/0025704 | A1 * | 1/2008 | Yoo et al. | 386/124 |
| 2010/0138736 | A1 * | 6/2010 | Wan | 715/234 |

FOREIGN PATENT DOCUMENTS

WO    0126378    4/2001

OTHER PUBLICATIONS

International Search Report and Written Opinion mailed Jan. 20, 2005 in corresponding PCT Application PCT/SE2004/001482.
Cover Page for ISO/IEC JTC 1/SC 29 N, 6792, Coding of Audio, Picture, Multimedia and Hypermedia Information, Jul. 13, 2005, Final Text of ISO/IEC 14496-3 3rd Edition: Information technology—Coding of audio-visual objects—Part 3: Audio (2 pages).
ISO/IEC 14496-3: 2005(E) Introduction (13 pages).
ISO/IEC 14496-3: 2005(E), Information technology Coding of audio-visual objects—Part 3: Audio, Subpart 1 (120 pages).

(Continued)

*Primary Examiner* — Andrew Y Koenig
*Assistant Examiner* — Ricky Chin
(74) *Attorney, Agent, or Firm* — Nixon & Vanderhye P.C.

(57) ABSTRACT

In a method for transmitting a multimedia presentation comprising a number of media objects: the media objects are organized in a multimedia container or container format; identifiers referring to the media objects are organized in the same container; and an identifiable file coordinating the media objects is also provided in the container.

25 Claims, 6 Drawing Sheets

OTHER PUBLICATIONS

ISO/IEC 14496-3: 2005(E), Subpart 2: Speech coding—HVXC (152 pages).
ISO/IEC 14496-3: 2005(E), Subpart 3: Speech coding—CELP (165 pages).
ISO/IEC 14496-3: 2005(E), Subpart 4: General Audio coding (GA)—AAC, TwinVQ, BSAC (344 pages).
ISO/IEC 14496-3: 2005(E), Subpart 5: Structured Audio (SA) (149 pages).
ISO/IEC 14496-3: 2005(E), Subpart 6: Text to Speech Interface (TTSI) (10 pages).
ISO/IEC 14496-3: 2005(E), Subpart 7: Parametric Audio Coding—HILN (59 pages).
ISO/IEC 14496-3: 2005(E), Subpart 8: Parametric coding for high quality audio—SSC (109 pages).
ISO/IEC 14496-3: 2005(E), Subpart 9: MPEG-1/2 Audio in MPEG-4 (14 pages).
ISO/IEC 14496-3: 2005(E), Subpart 10: Lossless coding of oversampled audio—DST (37 pages).
ITU-T Telecommunication Standardization Sector of ITU, H.263, Feb. 1998, Series H: Audiovisual and Multimedia Systems, Infrastructure of audiovisual services—Coding of moving video, Video coding for low bit rate communication (167 pages).
ITU-T Telecommunication Standardization Sector of ITU, H.263—Appendix III, Jun. 2001, Series H: Audiovisual and Multimedia Systems, Infrastructure of audiovisual services—Coding of moving video, Video coding for low bit rate communication—Appendix III: Examples of H.263 encoder/decoder implementations (50 pages).
Covering Note—ITU-T Recommendation H.263 Appendix II, May 2001, Recommended Optional Enhancement (1 page).
ITU-T Telecommunication Standardization Sector of ITU, H.263—Annex W, Nov. 2000, Series H: Audiovisual and Multimedia Systems, Infrastructure of audiovisual services—Coding of moving video, Video coding for low bit rate communication—Annex W: Additional supplemental enhancement information specification (21 pages).
ITU-T Telecommunication Standardization Sector of ITU, H.263—Annex V, Nov. 2000, Series H: Audiovisual and Multimedia Systems, Infrastructure of audiovisual services—Coding of moving video, Video coding for low bit rate communication—Annex V: Data-partitioned slice mode (14 pages).
ITU-T Telecommunication Standardization Sector of ITU, H.263—Annex U, Nov. 2000, Series H: Audiovisual and Multimedia Systems, Infrastructure of audiovisual services—Coding of moving video, Video coding for low bit rate communication—Annex U: Enhanced reference picture selection mode (35 pages).
ARIB STD-T63-26.071 V4.0.0, Mandatory Speech Codec speech processing functions; AMR Speech Codec; General Description (Release 4) (13 pages).
CCITT The International Telegraph and Telephone Consultative Committee, T.81, Sep. 1992, Terminal Equipment and Protocols for Telematic Services, Information Technology—Digital Compression and Coding of Continuous-Tone Still Images—Requirements and Guidelines (186 pages).
3GPP TS 26.244 V6.0.0, Mar. 2004, $3^{rd}$ Generation Partnership Project; Technical Specification Group Services and System Aspects Transparent end-to-end packet switched streaming service (PSS); 3GPP file format (3GP) (Release 6) (35 pages).
David Singer et al., "ISO Base Media File Format incorporating amendment 1", International Organisation for Standardisation, Organisation Internationale De Normalisation, Coding of Audio, Picture, Multimedia, and Hypermedia Information, ISO/IEC JTC1/SC29/ (98 pages).
3GPP TS 26.234 V6.0.0, Jun. 2004, $3^{rd}$ Generation Partnership Project; Technical Specification Group Services and System Aspects; Transparent end-to-end Packet switched Streaming Service (PSS); Protocols and codecs (Release 6) (94 pages).
ISO/IEC JTC 1/SC 29 N, 4298, Coding of Audio, Picture, Multimedia and Hypermedia Information, Jul. 16, 2001, Final Text of ISO/IEC 14496-2:2001: Information technology—Coding of audio-visual objects—Part 2: Visual (538 pages).
Mexican Office Action dated Mar. 13, 2009 w/ English translation (6 pages total).

\* cited by examiner

CONTAINER FORMAT FOR MULTIMEDIA PRESENTATIONS

This application claims priority to and benefit of U.S. Provisional Application No. 60/511,694, filed 17 Oct. 2003. The entire content of this application is incorporated herein by reference in its entirety.

TECHNICAL FIELD

The present invention relates to media objects in general, specifically to multimedia presentations including coordinated media objects.

BACKGROUND

Multimedia can be of many different types, e.g. video, audio, still images, vector graphics. Typically, each kind of media has a native file format, depending on the format of the media, for storage in computer systems.

For multimedia, there also exist a large number of compression formats that utilize spatial and/or temporal redundancies in order to obtain a compressed format of the media. A video file may, for instance, be compressed according to the H.263 compression standard [1], an audio clip as AMR [2] or AAC [3], and an image as JPEG [4].

There exist today a number of different methods for storing and/or transmitting files in general, and more specifically media files. One known such method is to include the files in a so-called file container. Examples of such containers include TAR (Tape Archive) for UNIX systems and Zip-files. Although these can contain media files they lack control functions for presentations, synchronization with timed media, and the possibility to interleave media. Another known method is to include files as e-mail attachments, so-called multi-part MIME. Here it is possible to point at start location for a presentation, but otherwise the above limitations apply. There is also another kind of multimedia formats that don't store media files per se, but frame media content of certain media types. These formats lack the transparency and integrity of a container format that can store and recover media files. Examples of such multimedia formats include ASF (Advanced Streaming Format) and Flash.

The Third-Generation Partnership Project (3GPP) has standardized the 3GPP file format (3GP) [5] for carriage of timed multimedia (audio and video), based on the ISO base media file format [6]. It is used by the so called Multimedia Messaging Service (MMS) and the transparent end-to-end packet switched streaming service (PSS) for distribution of multimedia [9]. Moreover, streaming servers for serving streamed media can use 3GP files.

SUMMARY

An object of the present invention is to enable improved transmission of multimedia presentations.

In particular, it is desirable to enable improved transmission of multimedia presentations including different file formats.

It is a specific object of the present invention to provide a solution for container formats for full media presentations including e.g. start point, discrete media objects and continuous media tracks, storing MIME types and having the possibility of compression of individual media objects.

It is another specific object of the present invention to provide a container that can store media objects interleaved by splitting media objects into multiple fragments that are interleaved.

It is yet another specific object of the present invention to provide a solution enabling progressive download of mixed media objects including both continuous media tracks (e.g. audio and video) and/or discrete files (individual images).

It is yet another specific object of the present invention to provide a solution for encryption using the new container format and a Protection information box.

It is yet another specific object of the present invention to provide a solution including information for decryption of individual files, media tracks, the full data box ("mdat") or parts thereof.

Embodiment(s) of the present invention enables combining all kinds of media types in one kind of file, such as 3GP. The embodiment(s) enable(s) doing this in a transparent way preserving the addressing, filename, and MIME types of individual media objects after they have been contained in the 3GP file.

The embodiment(s) also enable(s) interleaving all media in a container file such that it can be progressively downloaded to a user, i.e. downloaded in a format so that it can be rendered, with some delay, during the download. This is extended by information about initial delays depending on transport bit rate, represented as pairs. For bit rates in between the specified values, an upper estimate for the initial download delay can be obtained by linear interpolation. Another feature is the possibility of compressing individual files using e.g. gzip.

Some of the advantages include:

a container format that is simple and convenient (only one file to transport and play);

a container format that is optimized for short delay/progressive download (all media can be interleaved);

a container format that re-uses present technology (ISO based media file format and 3GP file format, SMIL, media types);

a container format which can be used with different media types.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described in the context of extending the prior art 3GPP file format (3GP) to a general container format for multimedia presentations. The invention may, however, be embodied in many different forms and should not be construed as limited to the examples and embodiments set forth herein. Rather, these examples and embodiments are provided so that this disclosure will be thorough, and will convey the invention to those skilled in the art.

It should be understood that the file format(s) may be represented in a storage medium such as a computer memory, or in a physical signal such as an electrical signal or a radio signal, e.g. for transfer within a local system or for transmission over a local or global network. In the following, the term file or media object will be used throughout the disclosure with a meaning including both data files for storage in a storage medium and signals for transfer or distribution.

Conventionally, the scope of the 3GP file format has been to carry timed multimedia (video, audio and timed text) and streaming hints of such media. 3GP files are used for interchange of video clips with associated audio (MMS)
download of timed text (PSS)
delivery of audio-visual presentations via progressive download (PSS)
serving audio-visual RTP streaming sessions (PSS)
delivery from content creators to streaming servers of streaming sessions (PSS).

The common denominator in the conventional art is that the content of a 3GP file is timed—a 3GP file contains one or more parallel tracks of timed multimedia or hints. Each track is divided into individually accessible time units that make synchronization and random access feasible. Of all the media types that can constitute a presentation in MSS or a session in PSS, 3GP files can only early audio, video and timed text.

The problem of handling several files or media objects for e.g. a presentation or progressive download of such a presentation includes:
1) It must be clear where the starting point is (e.g. the name or location of the SMIL file).
2) Content creators need to deliver several files or objects with dependencies to operators. This can cause problems as it involves many files that also need to be stored in a certain way to preserve their dependencies. If one file is missing, the presentation may not be possible to use at all. Therefore, it would be advantageous to be able to gather all media objects of a multimedia presentation in one container
3) Users need to handle several files instead of one "item". It has been identified as problematic to move or send several files to a peer and still keep the relative structure between the files.
4) The timing for requesting several files may be problematic as they may be of different size and span different time ranges. An interleaved file format that allows for media prepared for timely delivery is lacking. Moreover, the client would need to know, given a transport bandwidth, how much to download in bytes or seconds, before playback is started (in order to avoid interruptions).

In addition to multimedia that is carried by 3GP files there are a number of media types in PSS that are stored in their native file formats: still images (JPEG), bitmap graphics (GIF and PNG), vector graphics (SVG), synthetic audio (SP-MIDI) and text (XHTML and SMIL). As only audio and video are streamed in a PSS session, these media types must be delivered file-by-file via HTTP to a PSS client in conventional art.

If a progressively downloadable file is a part of the presentation, e.g. a progressively downloadable SVG file, such a file can be split and interleaved with other tracks or files of long duration.

An encryption mechanism is also needed that can reveal the content types "in the clear" for encoded content.

In an aspect, the embodiment(s) present invention defines a container format for multimedia presentations, whereby an entire multimedia presentation including media objects such as static media files and/or dynamic media streams and an identifiable scene description file can be transmitted and stored as one unit.

According to a specific embodiment of the present invention, the container format is an interleaved unit, which is optimized for progressive download. Thereby, an entire multimedia presentation can be transmitted and downloaded by so-called progressive download or streaming.

Figure 1:
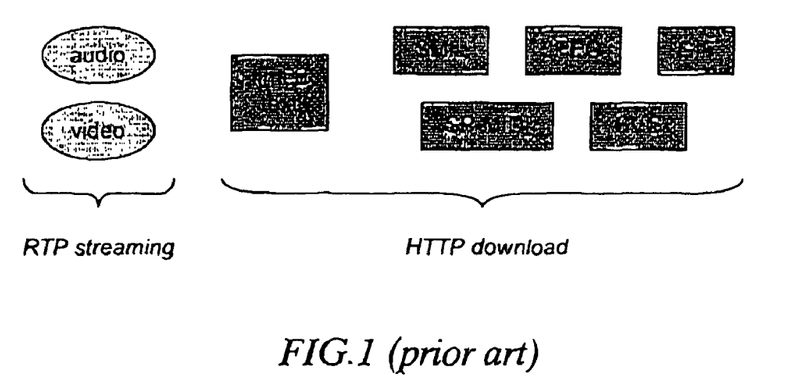
FIG. 1 is a schematic illustration of prior art relating to 3GPP.
Figure 2:
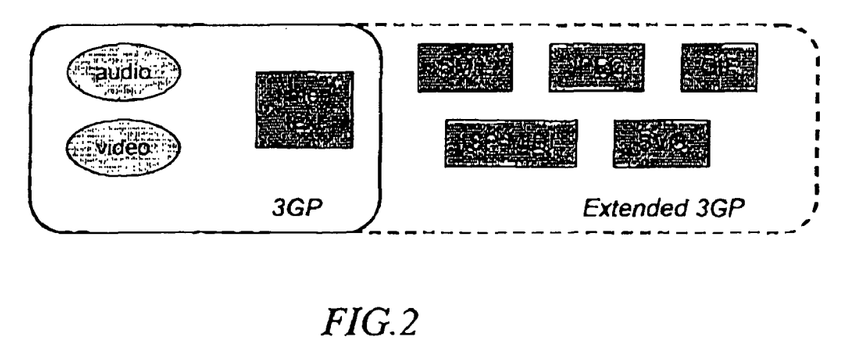
FIG. 2 is a schematic general illustration of an embodiment of the present invention.

The embodiment(s)enable(s) an extension of the currently existing 3GPP file format (3GP) to a general container format for multimedia presentations, see FIG. 1 and FIG. 2. An extended 3GP file or container according to an embodiment of the present invention is not limited to contain only continuous or timed multimedia, but can also include a scene description file (e.g. SMIL) and static media (images, graphics). Any kind of multimedia used in MMS and PSS can in principal be stored as a binary file within an extended 3GP file.

Figure 3:
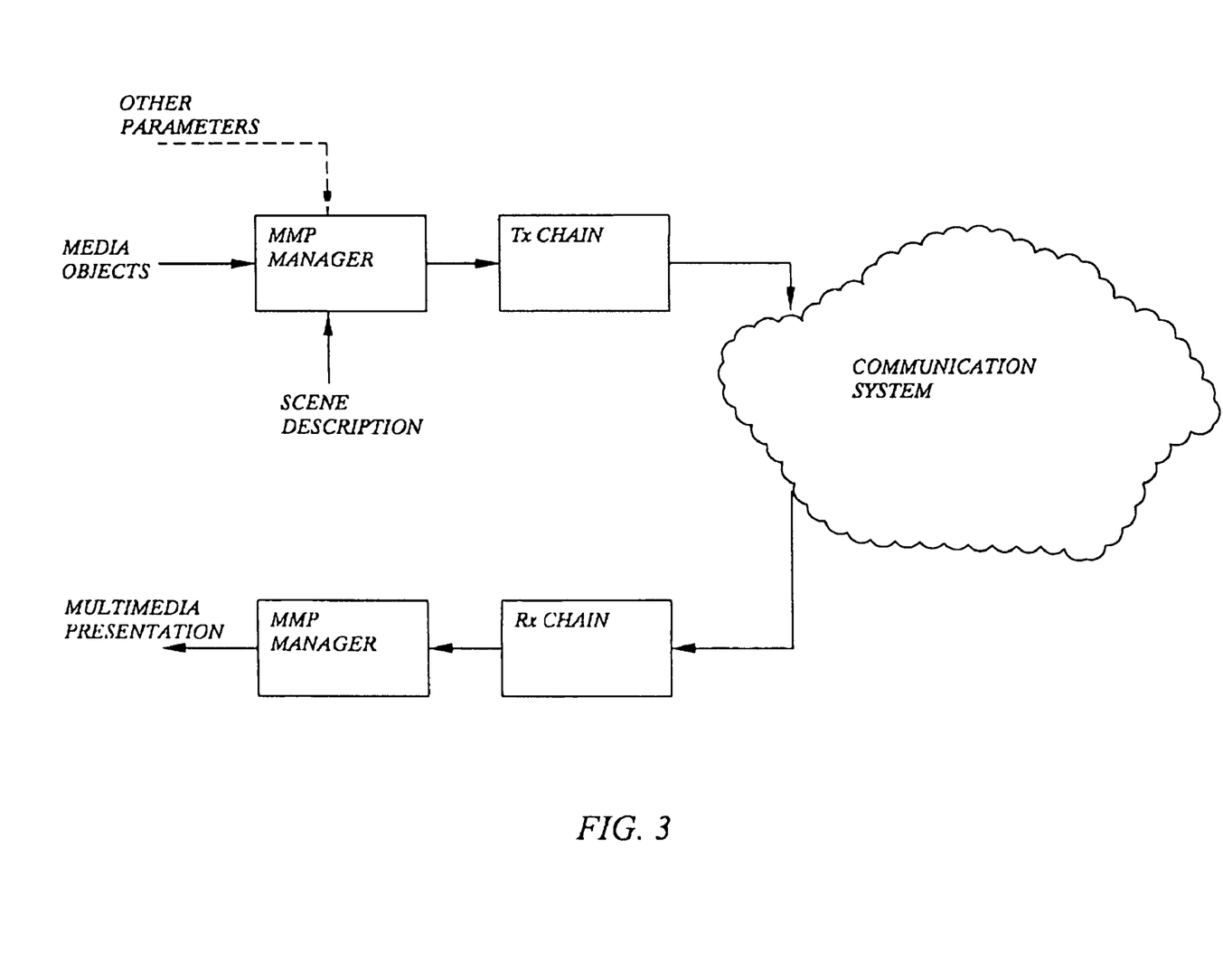
FIG. 3 is a schematic block diagram of a communication system in which embodiment(s) of the invention can be implemented.

The invention will be described in the context of the general communication system illustrated in FIG. 3, but is not limited to this specific illustration. The unit MMP MANAGER referred to as the MultiMediaPresentation manager, provides the functionalities according to the invention, such as organizing media object constituting a multimedia presentation as one unit for e.g. transmission, storage or display of the entire multimedia presentation.

Figure 4:
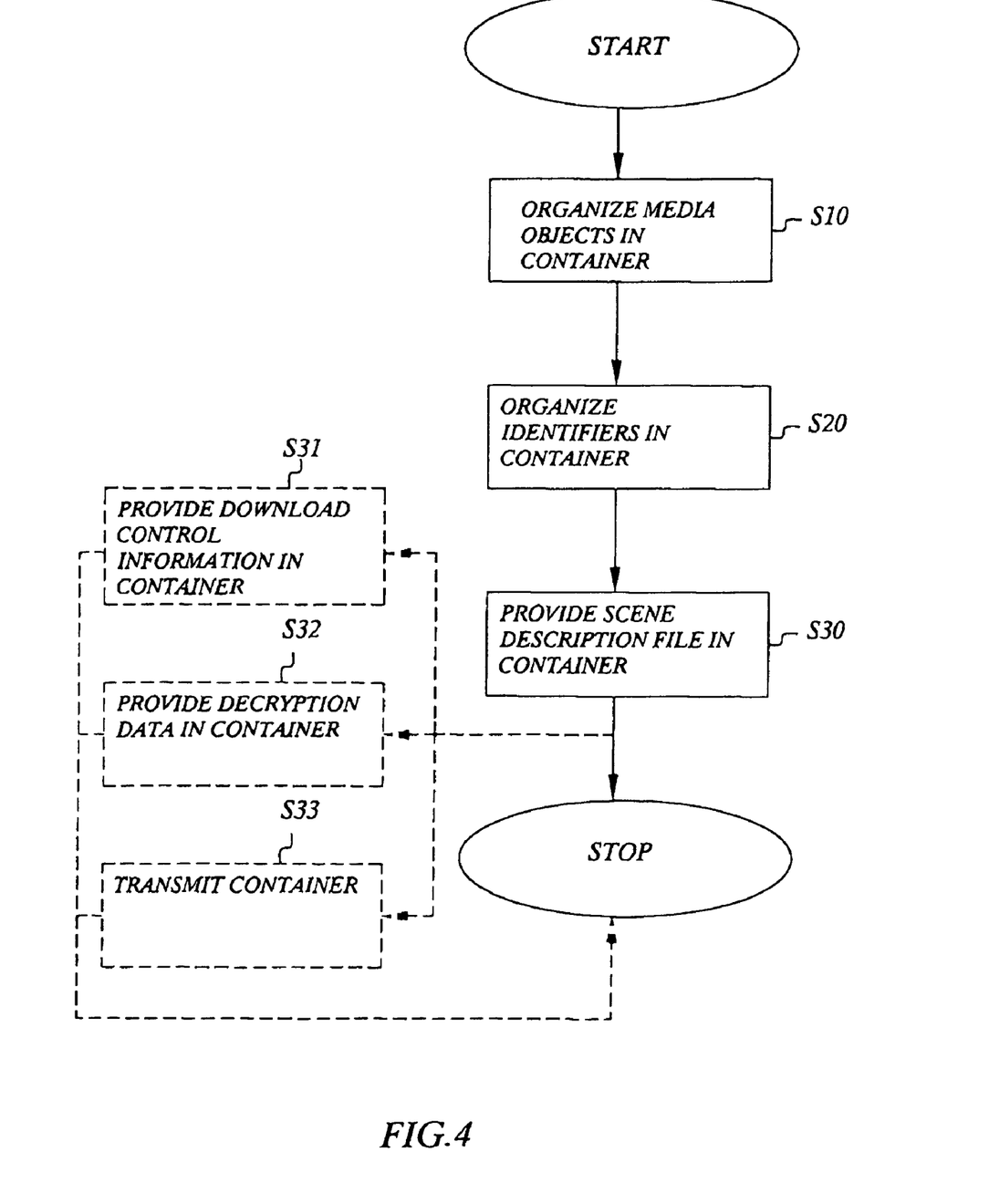
FIG. 4 is a schematic flow diagram of an example method according to the invention.

Referring to FIG. 4, an example method for transmitting a multimedia presentation comprising a number of media objects comprises packaging or organizing, in a first step S10, the media objects in a multimedia container or container format. In order to enable locating the media objects, a number of corresponding identifiers or locators are organized, in step S20, in the same container. Subsequently, in order to define the framework of the multimedia presentation, a so-called scene description file coordinating the media objects is provided, in step S30, in the same multimedia container. Finally, the entire container with the incorporated or included multimedia presentation is transmitted, in step S33, to some receiving unit.

The scene description should be clearly identifiable such that a receiving unit will be able to locate the scene description file as a starting position or starting file.

By the method, it is possible to package an entire multimedia presentation into one container, which then can be transmitted and/or downloaded as one unit or file from a transmitting unit Tx.

It is possible to apply progressive download, i.e. a receiving unit Rx can initialize rendering of received parts of the presentation while remaining parts are still being transmitted, so called Progressive Download.

The media objects can comprise media files, e.g. JPEG, GIF, SVG, PNG, SP-MIDI, XHTML, SMIL, and 3GP.

The media files can comprise dynamic media objects contained in tracks, e.g. video, audio and timed text.

The scene description file can be formatted according to any suitable standard e.g. any one of SMIL, XHTML, and SVG.

Yet another embodiment includes organizing both static media files and/or dynamic media streams in the same container.

According to a further specific embodiment, the media objects are organized as interleaved continuous fragments of data in the multimedia container. Other terms for fragments comprise parts, extents, and chunks.

Throughout the description the terms static, binary and discrete media files will be used interchangeably without limiting the scope of the media files to be of a certain kind.

In order to enable a receiving unit Rx to utilize progressive download, an embodiment of a method comprises the step S31 of providing control information enabling the rendering. The control information can include parameters such as initial or buffer delay based on a predetermined download rate.

In order to enable the inclusion of encrypted media files in the new container, an embodiment comprises the step S32 of providing key information for decryption or recognition of the manner of encryption of the encrypted media files.

Similarly, also with reference to FIG. 4, the steps S10-S30 represent an embodiment of a method for managing multimedia presentations. The method is closely related to the method for transmission, but without the step of transmission. The term managing is used in order to represent actions such as transmitting, storing, encrypting etc., but can also be regarded as a preparation of the media objects and associated information for such actions.

Since an entire multimedia presentation is contained in one file or container, it is very easy to store the presentation at some for storage facility. Similarly, it is easy to move the container e.g. from one part of a system to another or to distribute the container to a plurality of users.

The extension, according to an embodiment of the invention, of the 3GP file format typically comprises including a top-level file tree within the 3GP file. In this way a PSS presentation composed of several files, e.g. a SMIL file, an audio track and some images, can be packaged within a single 3GP file. The whole multimedia presentation can then be delivered, for example to a client via (progressive) download as one entity and played locally. Moreover, the extended 3GP format can be used to contain and deliver a complete PSS session as one entity to a PSS server. The server can then read the extended 3GP file and deliver the SMIL file and the images over HTTP and stream the audio track over RTP to the client.

The packaging or organizing of binary files, according to the invention, into a 3GP file can be designed to preserve the directory structure of the binary files, such that the relationships between the files are the same for separate files and the extended 3GP file. However, once binary files have been included in a 3GP file there is no need to unpack them in order to play or serve the content. All contained files are referenced in the same fashion from within or from the outside of the 3GP file.

The binary files or static media files are normally not contained in usual tracks, which are designed for timed multimedia, but referred to by identifiers in a file tree at the top level of a 3GP file. However, the included files themselves can be interleaved with the usual tracks such that the entire 3GP file can be used for progressive download.

Figure 5:
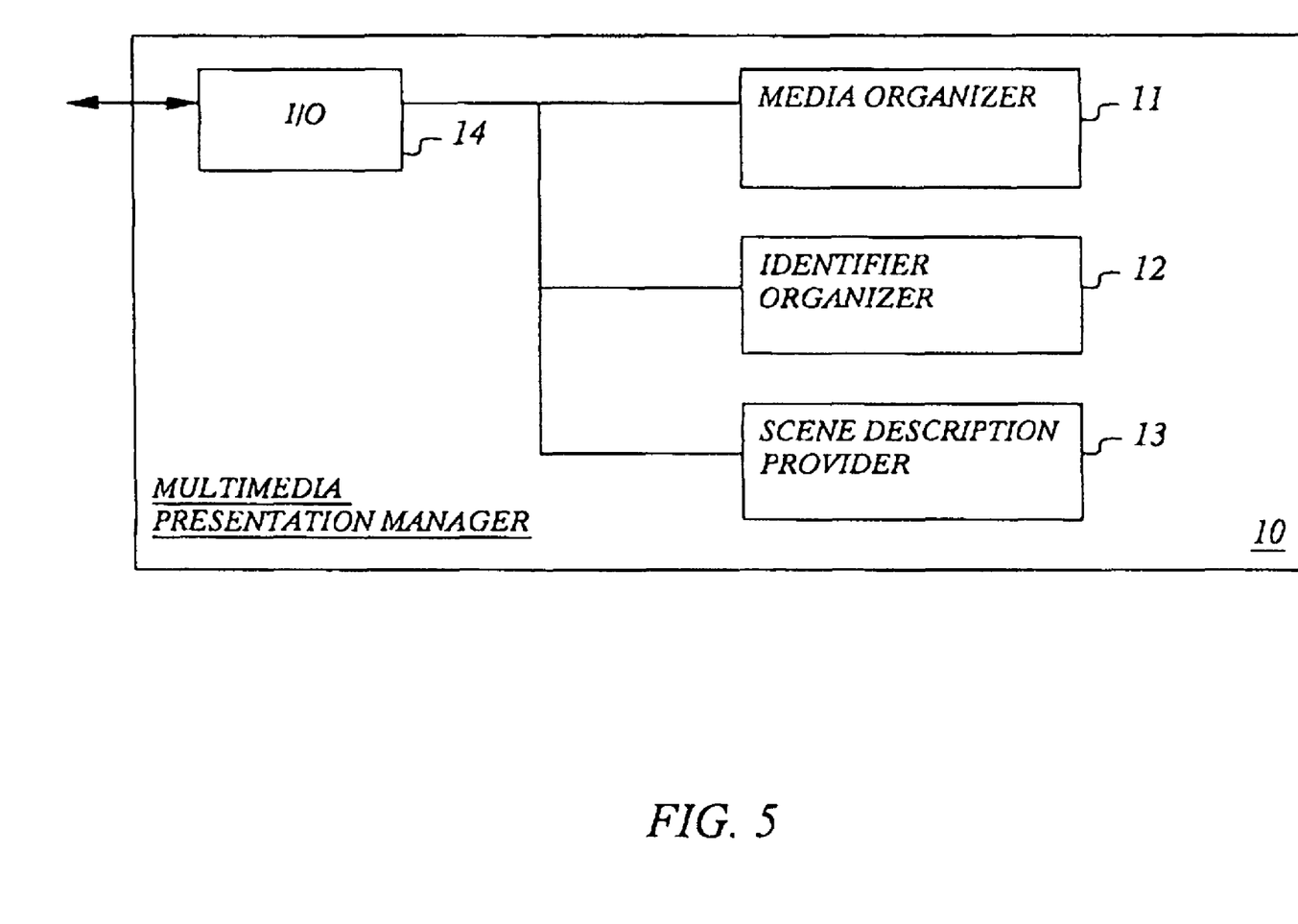
FIG. 5 is a schematic block diagram of an embodiment of an arrangement according to the invention.

An arrangement 10 for transmitting multimedia presentations according to an embodiment of the invention will be described with reference to FIG. 5.

The arrangement 10 comprises a unit 11 for organizing a number of media objects of a multimedia presentation in a multimedia container. Further, the arrangement 10 typically includes some a unit 12 for organizing identifiers that refer to the organized media objects in the same multimedia container. Also, the arrangement comprises a unit 13 for providing the container with an identifiable scene description file that coordinates the media objects based on the identifiers Finally, the arrangement 10 includes a unit 14 for transmitting the container with the incorporated multimedia presentation. In this particular embodiment, the transmitting unit 14 is represented by an I/O-unit.

The media objects can include both binary media files (e.g. MPEG, SVG, PNG, SP-MIDI, XHTML, SMIL, 3GP, JPEG, GIF) and/or dynamic media objects or streams (e.g. audio, video, timed text) contained in tracks.

In a specific embodiment of the invention, the media organizer 11 is configured or adapted to organize the media objects as interleaved continuous fragments of data. Other names for fragments comprise parts, extents and chunks.

According to another specific embodiment, the arrangement comprises means for providing control information that enables a receiving unit Rx to use progressive download when receiving the container, i.e. the receiving unit Rx can render or display or execute parts of the content of the multimedia presentation while still downloading remaining parts. Some of the control information can include, but is not limited to, initial or buffer delay based on some predetermined download rate.

Extending the 3GP file format, according to an embodiment, allows self-contained multimedia presentations comprising of a scene description, audio, video and other media types to be stored in one file. An extended 3GP file can thus contain a complete presentation, which makes it much easier to transport and store than several files with dependencies. Moreover, since all media in such a file can be interleaved, it will be particularly useful for progressive download. An extended 3GP file containing a mixed multimedia presentation can be progressively downloaded (and simultaneously played) on a client (PSS), locally played after delivery (PSS and MMS), and serve as a general distribution format of multimedia presentations (MBMS).

Moreover, a complete PSS session with hint tracks for RTP streaming as well as media files for RI FP download can be contained in an extended 3GP file. It will be conceptually simpler to distribute one file per session and use one file as source for both streaming and download during a session. Extended server files can be delivered to operators from content creators, used by PSS servers for streaming (tracks) and HTIP-delivery (media files).

Note that, also 3GP files can be included as binary files within extended 3GP files. For instance, a 3GP file containing a PSS session for serving audio and Timed text [6] includes an RTP hint track for audio and a separate 3GP file for Timed text. The reason is that Timed text is not streamed but delivered via HTTP in PSS Release 5.

Figure 6:
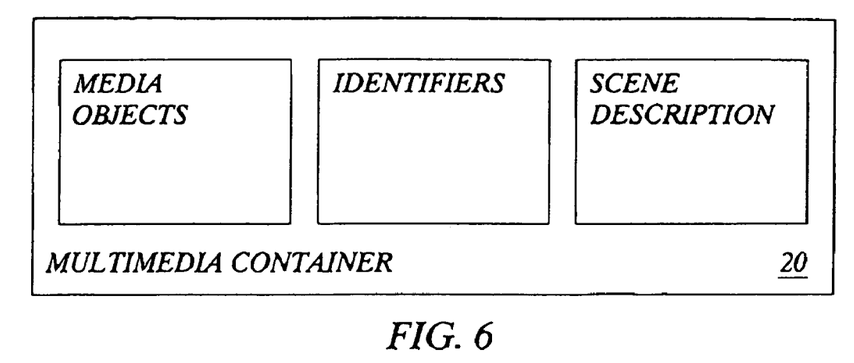
FIG. 6 is a schematic illustration of an embodiment of a multimedia container according to the invention.

An embodiment of a multimedia container will be described with reference to FIG. 6.

The multimedia container 20 includes a number of media objects, identifiers or locators referring to the media objects, and a scene description file coordinating the media objects based on the identifiers.

According to a specific embodiment, both static media files and/or dynamic media objects contained in tracks can be included the multimedia container 20. The media objects can be included as one or more interleaved continuous fragments of data or included in their native format.

Figure 7:
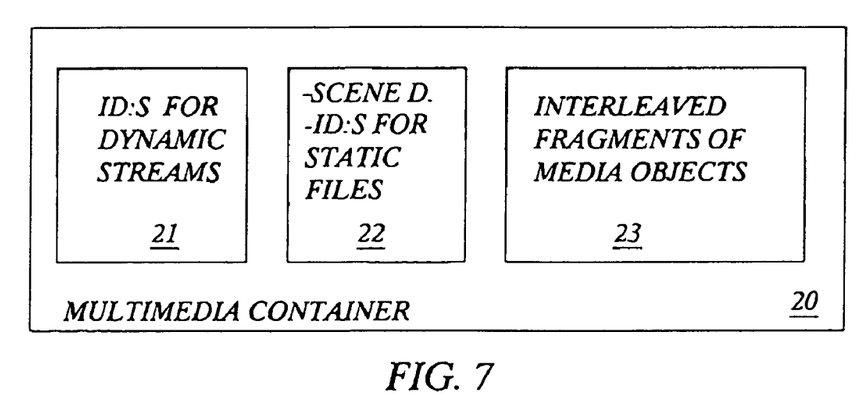
FIG. 7 is a schematic illustration of another embodiment of a multimedia container according to the invention.

According to another specific embodiment, referring to FIG. 7, the identifiers referring to dynamic media objects are located in a first section 21 of the container and the identifiers referring to static media files are located in a second section 22 of the container. The interleaved media objects (both static and dynamic) are located in a third section of the container. The actual order of the sections is not limited to this embodiment. In addition, the scene description file is preferably treated as a static or binary media file and as such included in the second section 22 of the container 20. However, the individual order of the sections in the multimedia container is not reflected by this embodiment.

Another specific embodiment of a multimedia container will be described with reference to FIG. 8 and FIG. 9.

In this embodiment, the first section 21 is represented by the movie box moov, the second section 22 is represented by the file tree box ftre, and the third section 23 is represented by the media data box mdat. In addition, the container 20, according to an embodiment, comprises a file type box ftyp including information regarding the container format type.

The extensions to 3GP, according to an embodiment, include a new profile brand for file trees, a file directory structure and rules on addressing files within an extended 3GP file.

The File-directory profile (branded '3gd6') is defined for 3GP files that include a file directory. Files conforming to the File-directory profile shall include a File tree with one or more file entries. One of these may be a start file, i.e. contain a scene description for the presentation or streaming session.

According to an embodiment of the container both static media files and dynamic media objects contained in tracks are included in the container. The File-directory profile can be used in combination with other 3GP profiles, as long as the file conforms to those profiles. In particular, File-directory and Basic profiles together imply that the file has both a file directory and one or more tracks with audio, video or text, File-directory, Basic and Progressive-download profiles together imply that the entire 3GP file including tracks and contained files is suitable for progressive download. Further details on the progressive download delay are provided in the file.

File-directory and Streaming-server profiles together imply that the server file
  contains one or more hint tracks for serving media streams over RTP,
  contains one or more binary files to be delivered over HTTP.

Among the binary files included in a server file, one may include a scene description (SMIL, HTML) for the PSS session. Additional files may be part of the session, i.e. images, SP-MIDI, Timed text, etc.

The embodiment(s) be described in more detail with reference to a specific and illustrative example.

According to another embodiment of a container, the container only includes static media files. In addition to adding a file directory to a 3GP file with tracks, the File-directory profile can be used for files that only contain a file directory and no tracks (no movie box), in other words, static or binary media files. Such 3GP files would be very useful for making self-contained presentations that don't necessarily include continuous media carried by tracks. Examples include slide shows for local play out or PSS sessions based on images, synthetic audio or text.

The File-directory profile is a 3GP profile and should be used with the file extension '0.3gp'.

File Tree

A file directory for storage of binary files is normally included at the top level of an extended 3GP file. The tree looks like a normal directory and can include any type of binary file and/or sub directories. The file directory is stored as meta-data in the File-tree box, whereas the binary content of the included files is stored as chunks in the Media-data box 'mdat' of the containing file.

Figure 8:
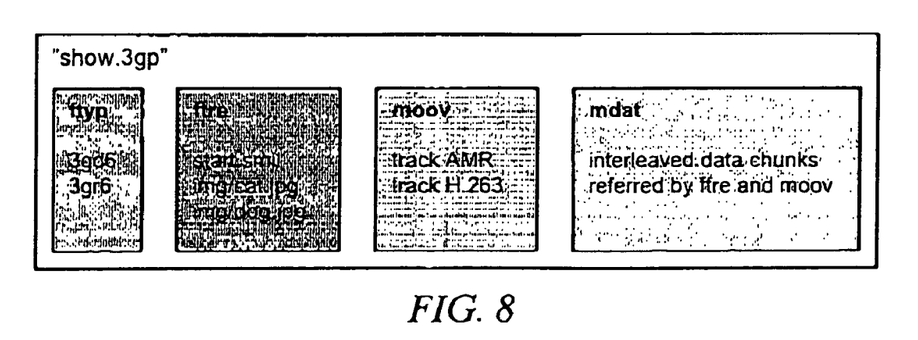
FIG. 8 is another schematic illustration of a specific embodiment of a multimedia container according to the invention.
Figure 9:
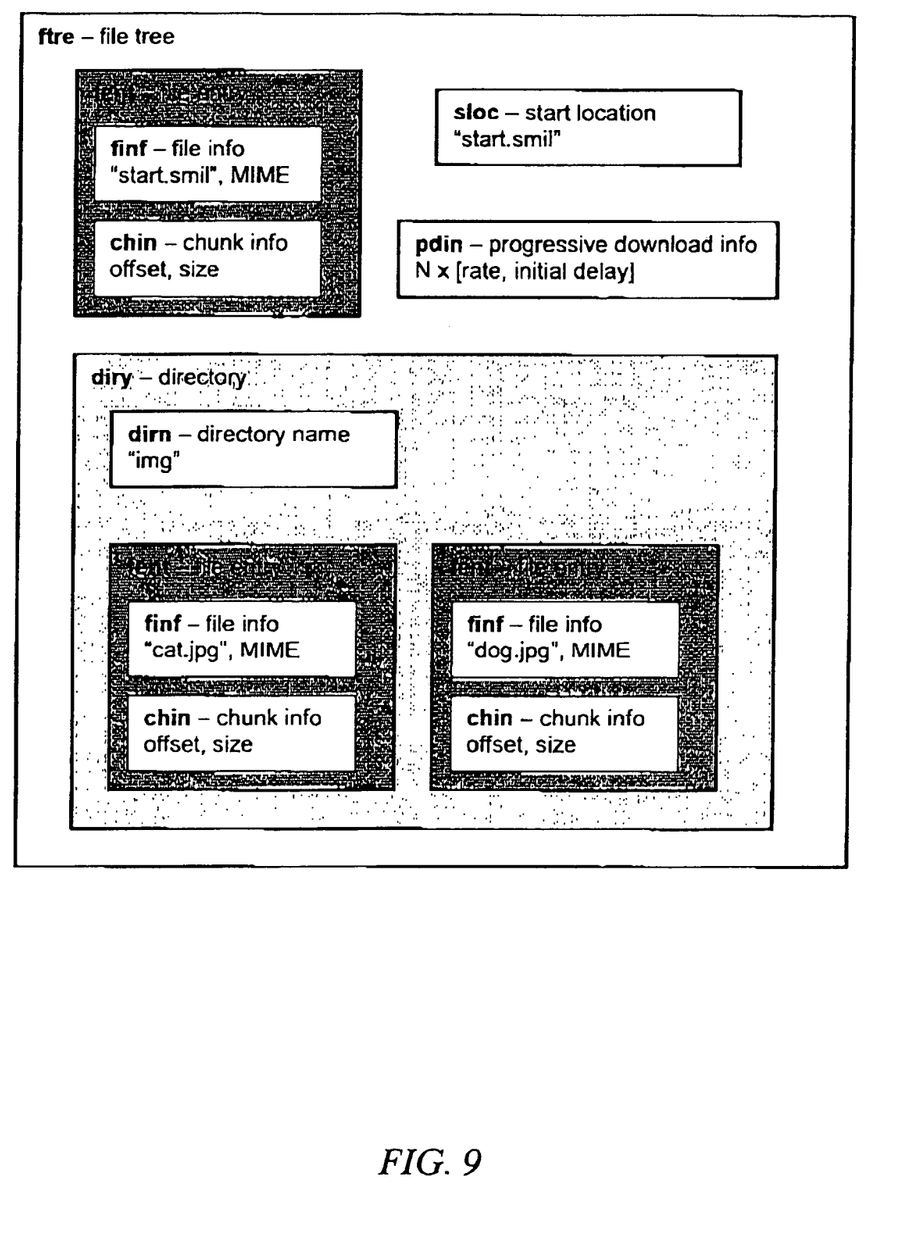
FIG. 9 is schematic illustration of an embodiment of part of the multimedia container in FIG. 8.

An example of a file tree is shown in FIG. 9, corresponding to the file entries in FIG. 8. The following sections explain the function of each box in FIG. 9.

The File-tree box 'ftre' is a container box. It is a top-level box and shall be located after the File-type box 'ftyp' in a 3GP file and preferably before the Movie box 'moov'. (See FIG. 8) In order to allow for future revisions, the File-tree box is based on a so-called Full box with version number, as shown in Table 1.

TABLE 1

| FileTreeBox | | | |
| --- | --- | --- | --- |
| Field | Type | Details | Value |
| BoxHeader.Size | Unsigned int(32) | | |
| BoxHeader.Type | Unsigned int(32) | | 'ftre' |
| BoxHeader.Version | Unsigned int(8) | | 0 |
| BoxHeader.Flags | Bit(24) | Contained boxes | 0 |

The File-tree box defines the root level of the 3GP file tree. A hierarchy of Directory boxes 'diry' defines lower levels of the file tree. Directory boxes according to Table 2 below are contained in the File-tree box or other Directory boxes.

TABLE 2

| DirectoryBox | | | |
| --- | --- | --- | --- |
| Field | Type | Details | Value |
| BoxHeader.Size | Unsigned int(32) | | |
| BoxHeader.Type | Unsigned int(32) | | 'diry' |
| BoxHeader.Version | Unsigned int(8) | | 0 |
| BoxHeader.Flags | Bit(24) | Contained boxes | 0 |

Each directory box can be required to contain one Directory-name box 'dirn' according to Table 3:

TABLE 3

| DirectoryNameBox | | | |
| --- | --- | --- | --- |
| Field | Type | Details | Value |
| BoxHeader.Size | Unsigned int(32) | | |
| BoxHeader.Type | Unsigned int(32) | | 'dirn' |
| BoxHeader.Version | Unsigned int(8) | | 0 |
| BoxHeader.Flags | Bit(24) | | 0 |
| DirectoryName | String | Directory name | |

Directory name is a null-terminated string in UTF-8 characters with the name of the directory.

File entry

A file in the file tree is defined by a File-entry box 'fent', that can be stored at any level in the file tree, including the root level. The File entry box is a container box and is defined below in Table 4.

TABLE 4

| FileEntryBox | | | |
|---|---|---|---|
| Field | Type | Details | Value |
| BoxHeader.Size | Unsigned int(32) | | |
| BoxHeader.Type | Unsigned int(32) | | 'fent' |
| BoxHeader.Version | Unsigned int(8) | | 0 |
| BoxHeader.Flags | Bit(24) | | 0 |
| FileInfoBox | | File name and MIME type | |
| ChunkInfoBox | | Location of file as a chunk | |
| Optional boxes | | | |

Each File entry box is preferred to include a File-info box 'finf' and a Chunk-info box 'chin', as defined below in Table 5 and Table 6.

TABLE 5

| FileInfoBox | | | |
|---|---|---|---|
| Field | Type | Details | Value |
| BoxHeader.Size | Unsigned int(32) | | |
| BoxHeader.Type | Unsigned int(32) | | 'finf' |
| BoxHeader.Version | Unsigned int(8) | | 0 |
| BoxHeader.Flags | Bit(24) | | 0 |
| FileName | String | File name including extension | |
| ContentType | String | MIME type | |
| ContentEncoding | String | Optional, indicates if the stored file is encoded | |

File name and Content type can be null-terminated strings in UTF-8 characters. Content type should be the MIME type for the file. Content encoding is an optional null-terminated string used to indicate that the file stored within the 3GP file is encoded, and needs to be decoded before interpreted, similar to Content-Encoding for HTTP 1.1. Some possible values are "gzip", "compress", "deflate", but for interoperability reasons, the only entry to be used is referred by "gzip".

TABLE 6

| ChunkInfoBox | | | |
|---|---|---|---|
| Field | Type | Details | Value |
| BoxHeader.Size | Unsigned int(32) | | |
| BoxHeader.Type | Unsigned int(32) | | 'chin' |
| BoxHeader.Version | Unsigned int(8) | | 0 |
| BoxHeader.Flags | Bit(24) | | 0 |
| [ChunkOffset, ChunkSize]×N | Unsigned int(64)[2×N] | Position and length of file chunk | |

The actual content of an included file can be stored as one or more continuous fragments (i.e. chunks, extents) of data in the media-data box 'mdat'. ChunkOffset is a 64 bit integer that gives the offset of the start of the chunk into the containing 3GP file and ChunkSize is a 64 bit integer that gives the size of the chunk, i.e. the length of the file defined by the File-entry box. Note that the chunk offset always refers to the containing file, i.e. the 3GP file. We have refrained from using a Data-reference box to indicate possible external locations of the data, as the point of including binary files in a 3GP file is to have a self-contained file.

In principle any type of file can be contained in the file tree. For PSS, the following media files are likely to be used: still images (JPEG), bitmap graphics (GIF and PNG), vector graphics (SVG), and synthetic audio (SP-MIDI), text (XHTML and SMIL), and 3GP files carrying Timed text. Any new kind of media file adopted for PSS, would also be possible to store in the file tree. This would for instance include DLS (down-loadable sound).

Start Location

An extended 3GP file may contain a scene description located anywhere in the file tree. If it is present, the File-tree box is preferred to contain a StartLocationBox according to Table 7.

TABLE 7

| StartLocationBox | | | |
|---|---|---|---|
| Field | Type | Details | Value |
| BoxHeader.Size | Unsigned int(32) | | |
| BoxHeader.Type | Unsigned int(32) | | 'sloc' |
| BoxHeader.Version | Unsigned int(8) | | 0 |
| BoxHeader.Flags | Bit(24) | | 0 |
| StartFileLocation | String | File path relative root level | |

StartFileLocation can be a null-terminated string in UTF-8 characters containing the path to the start file in the file directory, relative to the top level. As an example, to indicate that a file stored at the top level (in the file tree box) is a scene description, StartFileLocation would just contain the file name, e.g. start.smil.

Information on Progressive Download

An extended 3GP file may contain one Progressive-download information box 'pdin' located in the File-tree box, as defined below in Table 8:

TABLE 8

| ProgressiveDownloadInfoBox | | | |
|---|---|---|---|
| Field | Type | Details | Value |
| BoxHeader.Size | Unsigned int(32) | | |
| BoxHeader.Type | Unsigned int(32) | | 'pdin' |
| BoxHeader.Version | Unsigned int(8) | | 0 |
| BoxHeader.Flags | Bit(24) | | 0 |
| [Rate, InitialDelay]×N | Unsigned int(32)[2×N] | Pairs of bit rate and initial delay | |

This box can contain N pairs of numbers (to the end of the box) specifying combinations of transport bandwidth in units of 100 bits/sec and initial download delay in units of ms. By using this information, the receiving party can obtain an upper estimate for the initial delay by linear interpolation between pairs.

Addressing

Files and tracks within a 3GP file can be addressed consistently within the 3GP file as well as from the outside. The file directory and all tracks of a 3GP file reside at the top level, e.g. example.3gp/toplevelfile.smil and example.3gp/trackID=2.

As an example of addressing within a 3GP file, consider the multimedia container show.3gp outlined in FIG. 8. It contains
an H.263 track (with let's say track ID=1),
an AMR track (with let's say track ID=2),
a root-level SMIL file (start.smil), and
two images (cat.jpg and dog.jpg) in a directory (img).

The scene description in the SMIL file, located at the top level of the 3GP file, would refer to the media files in FIG. 8 as follows:
H.263 as trackID=1
AMR as trackID=2
cat.jpg as img/cat.jpg
dog.jpg as img/dog.jpg From outside the content of the 3GP file, according to an embodiment, is addressed as follows:
SMIL as show.3gp/start.smil
H.263 as show.3gp/trackID=1
AMR as show.3gp/trackID=2
cat.jpg as show.3gp/img/cat.jpg
dog.jpg as show.3gp/img/dog.jpg Now consider moving the SMIL file in the previous example to the directory img containing the images. Relative to the SMIL file, the media is now referred as follows:
H.263 as ../trackID=1
AMR as ../trackID=2
cat.jpg as cat.jpg
dog.jpg as dog.jpg From outside the content of the 3GP file would now be addressed as follows:
SMIL as show.3gp/img/start.smil
H.263 as show.3gp/trackID=1
AMR as show.3gp/trackID=2
cat.jpg as show.3gp/img/cat.jpg
dog.jpg as show.3gp/img/dog.jpg Files contained in the file tree may be delivered over HTTP before or during a PSS session. An HTTP server delivering a binary file stored inside a 3GP file shall
set the Content-Type to the value of the file entry box,
set the Content-Location to the URI of the binary file within the 3GP file.

As an example, the 3GP file in FIG. 8 with hint tracks included may contain a PSS session. When the client accesses the SMIL file over HTTP, it also receives the Content-Location of the SMIL file, e.g. "http://mediaportal/show.3gp/". All HTTP references within the SMIL file will then be based upon the Content-Location, enabling HTTP GET to refer to binary files within the 3GP file.

A client can in the same manner resolve the URIs for RTSP based on the Content-Location of the SMIL file, enabling RTSP DESCRIBE to refer to the 3GP file and, RTSP SETUP to refer to tracks.

Example: Retrieval of SMIL File and Resolving URI to Resources Pointed Out within the SMIL File

```
GET         /exampledir/show.3gp/img/start.smil       HTTP/1.1
Host: www.example.com
```

-continued

```
HTTP/1.1            200                         OK
Content-Location:
http://www.example.com/exampledir/show.3gp/img/start.smil
Content-Size:                                xxxxxx
Content-Type:                         application/smil
<smil>
  <body>
    <seq>
      <image src="cat.jpg" dur="3s"/>
      <image src="dog.jpg" dur="5s"/>
    </seq>
  </body>
</smil>
```

The above fetched SMIL presentation will thus be given the base URI:
"http://www.example.com/exampledir/show.3gp/img/start.smil", which when the processing of the SMIL file is performed will result in that the resolved HTTP URIs:
"http://www.example.com/exampledir/show.3gp/img/cat.jpg"
"http://www.example.com/exampledir/show.3gp/img/dog.jpg"

File Formats and Encryption

Conventionally, it is possible to extend the 3GP file format with a mechanism for storage of encrypted media. In addition 3GPP-specific extensions that apply to encryption of text tracks and a 3GP profile brand for encrypted 3GP files are defined. Details on the encryption scheme are stored in a protection information box. For the usage of encrypted 3GP files with OMA DRM ver 2, the exact details of the scheme will be defined by OMA.

The general idea behind the extensions is to replace code points (codec identifiers) of encrypted media with generic code points for encrypted media. This prevents legacy players and other encryption-unaware players from accessing bit streams that need to be decrypted before they can be decoded. For encryption-aware players, however, the new code points contain information on key management and requirements for decrypting encrypted media. In addition they replicate the original codec identifier and other decoding parameters needed to decode the bit streams once they have been decrypted.

Encrypted 3GP files can also be used for streaming servers to serve encrypted media over RTP. Hint tracks of such 3GP files are not encrypted per se, i.e. a PSS server does not have to decrypt anything in order to serve the encrypted content. Information on key management and decryption is conveyed to the client in the SDP description, with the relevant parts stored in the hint track of the 3GP file. However, as the content provider may want to force the server to take certain actions, such as providing integrity protection before data is streamed; there is still a need to redefine the code point for hint tracks as well. The new code points replicate the original code point information while providing information on required integrity protection. This way encryption-unaware servers will be prevented to serve encrypted data that were supposed to be integrity prevented.

Profile for Encrypted 3GP Files

One way to signal encrypted media in a 3GP file is to define and use an Encryption profile (branded '3ge6') Further details on the kind of file that is encrypted is given by other brands, such as a Basic profile brand for download of audio/video presentations or Streaming-server profile for serving of encrypted content.

Files conforming to Encryption profile shall use the encrypted-sample description entries (code points) for media tracks containing encrypted media. A file conforming to Encryption profile may contain both encrypted and unencrypted tracks, but not if they are of the same media type.

The Encryption profile should be used as a major brand. It can also be used in combination with other 3GP profiles, as long as the file conforms to those profiles.

In particular,

Encryption and Basic profiles together imply that the maximum number of tracks shall be one for video, one for audio and one for text. A file may contain both encrypted and unencrypted tracks. Note however, that an encryption-unaware player will ignore encrypted tracks.

Encryption and Progressive download profiles together imply that the file is both encrypted and suitable for progressive download.

Encryption and Streaming-server profile imply that the content referred to by one or more hint tracks is encrypted. If a PSS server is required to take special actions, such as provide integrity protection, encrypted sample description entries (code points) for hint tracks shall be used.

Note that the General profile is defined as a superset of all profiles including Encryption profile. A 3GP file conforming to General profile (only) may contain any number of encrypted tracks not yet combined into 3GP files suitable for download or streaming or without necessary information on key management.

The Encrypted-basic profile is a 3GP profile and should be used with the file extension '0.3gp'.

Code Points for Encrypted Media

The sample description entries of a media track in a 3GP file identify the format of the encoded media, i.e. codec and other coding parameters. Hence, by simply parsing the sample descriptions, a player can decide which tracks it is able to play.

All sample entries for audio and video derived from the ISO base media file format contain a set of mandatory fields. In addition, they may contain boxes specific to the codec in question. MPEG-4 codecs (Visual and AAC) use the ESDBox, whereas AMR and H.263 use the AMRSpecificBox and the H263SpecificBox, respectively.

The principle behind storing encrypted media in a track is to "disguise" the original sample description entry with a generic code point for encrypted media. We define three code points (four-character codes of the sample description entries) for signalling encrypted video, audio and text as follows in Table 9:

TABLE 9

| format identifier | original format | media content |
|---|---|---|
| encv | s263, mp4v | encrypted video: H.263 or MPEG-4 visual |
| enca | samr, sawb, mp4a | encrypted audio: AMR, AMR-WB or AAC |
| enct | 3gtt | encrypted text: timed text |

The "encrypted" versions of the sample descriptions replicate the original sample descriptions and include a protection information box with details on the original format as well as all requirements for decrypting the encoded media. The EncryptedVideoSampleEntry and the EncryptedAudio SampleEntry are defined in Table 10 and Table 11, where TheProtectionInfo box is simply added to the list of boxes contained in a sample entry.

TABLE 10

EncryptedVideoSampleEntry

| Field | Type | Details | Value |
|---|---|---|---|
| BoxHeader.Size | Unsigned int(32) | | |
| BoxHeader.Type | Unsigned int(32) | | 'encv' |
| All fields and boxes of a visual sample entry, e.g. MP4VisualSampleEntry or H.263SampleEntry. | | | |
| ProtectionInfoBox | | Box with information on the original format and encryption | |

TABLE 11

EncryptedAudioSampleEntry

| Field | Type | Details | Value |
|---|---|---|---|
| BoxHeader.Size | Unsigned int(32) | | |
| BoxHeader.Type | Unsigned int(32) | | 'enca' |
| All fields and boxes in an audio sample entry, e.g. MP4AudioSampleEntry or AMRSampleEntry. | | | |
| ProtectionInfoBox | | Box with information on the original format and encryption | |

The EncryptedTextSampleEntry is defined in Table 12. Text tracks are specific to 3GP files and defined by the Timed text format in 26.245. In analogy with the cases for audio and video, we add a ProtectionInfoBox at the end.

TABLE 12

EncryptedTextSampleEntry

| Field | Type | Details | Value |
|---|---|---|---|
| BoxHeader.Size | Unsigned int(32) | | |
| BoxHeader.Type | Unsigned int(32) | | 'enct' |
| All fields and boxes of TextSampleEntry. | | | |
| ProtectionInfoBox | | Box with information on the original format and encryption | |

Key Management

The necessary requirements for decrypting media are stored in the Protection information box. It contains the Original format box, which identifies the codec of the decrypted media, the Scheme type box, which identifies the protection scheme used to protect the media, and the Scheme information box, which contains scheme-specific data (defined for each scheme). The protection information box and its contained boxes are defined in Table 13-Table 16.

TABLE 13

ProtectionInfoBox

| Field | Type | Details | Value |
|---|---|---|---|
| BoxHeader.Size | Unsigned int(32) | | |
| BoxHeader.Type | Unsigned int(32) | | 'sinf' |
| BoxHeader.Version | Unsigned int(8) | | 0 |
| BoxHeader.Flags | Bit(24) | | 0 |
| OriginalFormatBox | | Box containing identifying the original format | |
| SchemeTypeBox | | Box containing the protection scheme. | |

TABLE 13-continued

ProtectionInfoBox

| Field | Type | Details | Value |
|---|---|---|---|
| SchemeInformationBox | | Box containing the scheme information. | |

TABLE 14

OriginalFormatBox

| Field | Type | Details | Value |
|---|---|---|---|
| BoxHeader.Size | Unsigned int(32) | | |
| BoxHeader.Type | Unsigned int(32) | | 'frma' |
| DataFormat | Unsigned int(32) | orginal format | |

DataFormat identifies the format (codec) of the decrypted, encoded data. The currently defined formats in 3GP files include 'mp4v', 'h263', 'mp4a', 'samr', sawb' and '3gtt'.

TABLE 15

SchemeTypeBox

| Field | Type | Details | Value |
|---|---|---|---|
| BoxHeader.Size | Unsigned int(32) | | |
| BoxHeader.Type | Unsigned int(32) | | 'schm' |
| BoxHeader.Version | Unsigned int(8) | | 0 |
| BoxHeader.Flags | Bit(24) | | 0 or 1 |
| SchemeType | Unsigned int(32) | 4cc identifying the scheme | |
| SchemeVersion | Unsigned int(16) | Version number | |
| SchemeURI | Unsigned int(8)[ ] | Browser URI (null-terminated UTF-8 string). Present if (Flags & 1) true | |

SchemeType and SchemeVersion identify the encryption scheme and its version. An example that can be used for OMA DRM is given in the following section. As an option, it is possible to include an URI pointing to a web page for users that don't have the encryption scheme installed.

TABLE 16

SchemeInformationBox

| Field | Type | Details | Value |
|---|---|---|---|
| BoxHeader.Size | Unsigned int(32) | | |
| BoxHeader.Type | Unsigned int(32) | | 'schi' |
| BoxHeader.Version | Unsigned int(8) | | 0 |
| BoxHeader.Flags | Bit(24) | Box(es) specific to scheme identified by SchemeType | 0 |

The boxes contained the SchemeInformationBox are defined by the scheme type.

Example of Encryption Scheme

The encryption scheme to be used by OMA is currently developed by OMA DLDRM. As the scheme will be defined by OMA, OMA should also define the file format boxes expressing the scheme in 3GP files. Below is an example of how such a definition may look like:

Scheme type: 'odrm'
Scheme version: 0
Scheme-specific boxes: OMADRMSampleFormatBox and OMADRMHeadersBox, see Table 17 and Table 18,

TABLE 17

OMADRMSampleFormatBox

| Field | Type | Details | Value |
|---|---|---|---|
| BoxHeader.Size | Unsigned int(32) | | |
| BoxHeader.Type | Unsigned int(32) | | 'osfm' |
| BoxHeader.Version | Unsigned int(8) | | 0 |
| BoxHeader.Flags | Bit(24) | | 0 |
| SelectiveEncryption | Bit(1) | | 0 or 1 |
| Reserved | Bit(7) | | 0 |
| KeyIndicatorLength | Unsigned int(8) | Length of key indicator | |
| IVLength | Unsigned int(8) | Length of IV | |

TABLE 18

OMADRMHeadersBox

| Field | Type | Details | Value |
|---|---|---|---|
| BoxHeader.Size | Unsigned int(32) | | |
| BoxHeader.Type | Unsigned int(32) | | 'ohdr' |
| BoxHeader.Version | Unsigned int(8) | | 0 |
| BoxHeader.Flags | Bit(24) | | 0 |
| CTLen | Unsigned int(8) | Length of fixed headers (for performance reasons) | |
| CIDLen | Unsigned int(8) | Length of Content ID | |
| ContentType | Unsigned int(8)[CTLen] | Content Type header | |
| ContentID | Unsigned int(8)[CIDLen] | Content ID header | |
| Headers | Unsigned int(8) [ ] | Rest of headers, including issuer URL, to end of box | |

Encrypted Server Files

PSS servers can also use 3GP files for streaming of encrypted media. The principle here is to packetize-then-encrypt. Conceptually, there is no difference between serving encrypted media and unencrypted media from a 3GP server file. In both cases, the PSS server can simply follow the hint instructions of the file. All the necessary information for using the streamed media is conveyed to the client via the SDP description. For encrypted media this also includes the requirements for decrypting the media streams.

Encryption

According to a specific embodiment of the present invention, it is possible to include encrypted media files in an extended 3GP file. Consequently, a solution for encryption and decryption using the container file format and the Protection information box will be described below.

By default, binary files are stored "in the clear". However, it is also possible to include encrypted binary files in the file directory of a 3GP file. The presence of a Protection information box in a file entry box indicates that the content of the binary file (media data) is encrypted. Moreover, the Protection information box identifies the encryption scheme and all information required to decrypt the corresponding media data.

The Protection information box here is the same as the protection information box proposed for encrypted tracks in Table 13-Table 18. The definition is the same, although the Original-format box shall be ignored (should not be included) for binary files. Note that the purpose of the protection information box for binary files is two-fold: it indicates that media is encrypted and it gives the requirements for decrypting it.

The Protection information box 'sint' contains the Scheme type box 'schm', which identifies the protection scheme used to protect the media, and the Scheme information box 'schi', which contains scheme-specific data (defined for each scheme.

The boxes contained by the SchemeInformationBox are defined by the scheme type. Similarly, it is possible to define boxes that apply to the full 'mdat' or a byte range inside 'mdat'. This could be good for a presentation with many small files.

According to the invention, the 3GP file format is extended to a general container format by inclusion of a file tree for binary files, comprising information such as their MIME types Any kind of multimedia used in MMS and PSS can thus be stored in a 3GP file together with a scene description The container format is constructed in such a way as to allow for progressive download of a whole multimedia presentation or session. Thereby, extended 3GP files can be delivered by download or progressive download, and played by 3GP players. Such extended 3GP files with hint tracks can contain entire PSS sessions and be served by PSS servers, where continues media is streamed via RTP and media files are delivered via HTTP.

3GP files that are extended according to the invention and contain a file tree may define a 3GP profile (brand). Files in the file tree can be stored "in the clear" or encrypted together with requirements on how to decrypt them.

For fragmented files, the full presentation is made into more than one fragment. The presentation will then be (progressively) downloadable fragment by fragment, where later fragments will enhance the previous ones with more files or media tracks or continuation of files or media tracks. It is also possible to have live download by sending the presentation fragment by fragment. For the overall presentation organization, having SMIL-files in several fragments, and a scheme for how to update, enhance or replace a SMIL file can do this.

Moreover, the invention relates to how the presentation can be combined with a scene description and how it can be used as a container format for mixed sessions where some media is streamed and other is downloaded.

It will be understood by those skilled in the art that various modifications and changes may be made to the present invention without departure from the scope thereof, which is defined by the appended claims.

REFERENCES

[1] ITU-T Recommendation H.263 (2001), *Video codec for low bit rate communication*.
[2] 3GPP TS 26.071: *Mandatory Speech CODEC speech processing functions; AMR Speech CODEC; General description*.
[3] ISO/IEC 14496-2:2001, *Information technology—Coding of audio-visual objects—Part 3: Audio* (MPEG-4 part 3).
[4] ITU-T Recommendation T.81 (1992).
[5] 3GPP TS 26.244: *Transparent end-to-end packet switched streaming service (PSS)*; 3*GPP file format (3GP)*.
[6] ISO/IEC 14496-12:2003 | 15444-12:2003: *Information technology—Coding of audio-visual objects—Part 12: ISO base media file format | Information technology—JPEG 2000 image coding system—Part 12: ISO base media file format*.
[7] U.S. Pat. No. 2003/0053416 A1, *Generalized Reference Decoder for Image or Video Processing*, Ribas-Corbera et al., Microsoft.
[9] 3GPP TS 26.234: *Transparent end-to-end packet switched streaming service (PSS); Protocols and codecs*.

The invention claimed is:

1. A method performed at a multimedia presentation manager for transmitting a self-contained multimedia presentation as one unit, said multimedia presentation comprising a plurality of media objects, said method comprising:
    organizing said plurality of media objects in a multimedia container, said media objects comprising one or a combination of dynamic media objects in tracks and static media files, wherein said step of organizing the media objects comprises said communication system organizing the media objects as interleaved continuous fragments of data in the multimedia container;
    organizing, in said multimedia container, identifiers referring to each of said plurality of media objects;
    providing, in said multimedia container, an identifiable scene description file as a starting file for coordinating the plurality of media objects based on said identifiers, to enable identification of a start of said multimedia presentation and dependencies between said plurality of media objects of said multimedia presentation; and
    transmitting said multimedia container and the incorporated multimedia presentation,
    wherein said step of organizing, in said multimedia container, identifiers referring to each of said plurality of media objects comprises:
    organizing and locating said identifiers referring to said dynamic media objects in a first section of said multimedia container; and
    organizing and locating said identifiers referring to said static media files in a second section of said multimedia container different from said first section,
    wherein said step of organizing said plurality of media objects in said multimedia container comprises organizing and locating said interleaved media objects in a third section of said multimedia container different from said first and second sections, and
    wherein said step of providing said scene description file comprises treating said scene description file as a static file and including said scene description file in said second section of said multimedia container.

2. The method according to claim 1, wherein said multimedia container is progressively transmitted to at least one receiver.

3. The method according to claim 1, wherein a receiver renders the identifiable scene description file and media objects of said multimedia container during the transmission.

4. The method according to claim 1, wherein at least one of said media objects is encrypted and said method further comprises providing decryption data for enabling decryption of said at least one encrypted media object.

5. The method according to claim 1, wherein said step of providing the scene description file comprises providing a start location of said scene description file, said start location being a file path relative to a root level directory of said multimedia container.

6. The method according to claim 5, wherein said identifiers referring to each of said plurality of media objects are provided in said scene description file as a file path relative to a directory in which said scene description file is located.

7. A multimedia presentation manager for transmitting a self-contained multimedia presentation as one unit, said multimedia presentation comprising a plurality of objects, said multimedia presentation manager comprising:
 means for organizing the plurality of media objects in a multimedia container, said media objects comprising one or a combination of dynamic media objects in tracks and static media files, wherein said means for organizing the plurality of media objects organizes the media objects as interleaved continuous fragments of data in the multimedia container;
 means for organizing, in said multimedia container, identifiers referring to each of said plurality of media objects;
 means for providing, in said multimedia container, an identifiable scene description file as a starting file for coordinating the plurality of media objects based on said identifiers, to enable identification of a start of said multimedia presentation and dependencies between said plurality of media objects of said multimedia presentation; and
 means for transmitting said multimedia container and the incorporated multimedia presentation, thereby enabling display of the multimedia presentation directly from the transmitted multimedia container,
 wherein said means for organizing, in said multimedia container, identifiers referring to each of said plurality of media objects are adapted to organize and locate said identifiers referring to said dynamic media objects in a first section of said multimedia container, and organize and locate said identifiers referring to said static media files in a second section of said multimedia container different from said first section,
 wherein said means for organizing said plurality of media objects in said multimedia container are adapted to organize and locate said interleaved media objects in a third section of said multimedia container different from said first and second sections, and
 wherein said means for providing said scene description file are adapted to treat said scene description file as a static file and to include said scene description file in said second section of said multimedia container.

8. The multimedia presentation manager according to claim 7, wherein said multimedia container is configured to enable a receiver to render the identifiable scene description file and media objects of said multimedia container during the transmission.

9. The multimedia presentation manager according to claim 7, wherein at least one of said media files is encrypted and said multimedia presentation manager further comprising means for providing decryption data for enabling decryption of said at least one encrypted media object.

10. The multimedia presentation manager according to claim 7, wherein said means for providing the scene description file are adapted to provide a start location of said scene description file, said start location being a file path relative to a root level directory of said multimedia container.

11. A non-transitory computer readable medium storing therein a self-contained multimedia container for multimedia presentations comprising a plurality of media objects, said multimedia container being one unit comprising:
 said plurality of media objects, comprising one or a combination of dynamic media objects in tracks and static media files, wherein said media objects are organized as interleaved continuous fragments of data in a section of the multimedia container;
 identifiers referring to said plurality of media objects; and
 an identifiable scene description file as a starting file for coordinating the plurality of media objects based on said identifiers, to enable identification of a start of said multimedia presentation and dependencies between said plurality of media objects of said multimedia presentation,
 wherein said section of the multimedia container in which said media objects are organized and interleaved is a third section of said multimedia container, said multimedia container further comprising:
 a first section in which said identifiers referring to said dynamic media objects are organized and located, said first section being different from said third section; and
 a second section in which said identifiers referring to said static media files are organized and located, said second section being different from said first and third sections,
 wherein said scene description file is a static file and located in said second section.

12. The non-transitory computer readable medium according to claim 11, wherein
 identifiers referring to the static media files are located in a second section of the multimedia container; and
 identifiers referring to the dynamic media objects are located in a third section of the multimedia container.

13. The non-transitory computer readable medium according to claim 12, wherein said identifiable scene description file is located in said second section of the multimedia container.

14. The non-transitory computer readable medium according to claim 11, wherein said multimedia container comprises download control information enabling a receiver to render the scene description and media objects of said multimedia container during transmission of the multimedia container.

15. The non-transitory computer readable medium according to claim 14, wherein said download control information is located in a fourth separate section of the multimedia container.

16. The non-transitory computer readable medium according to claim 11, wherein said media objects are formatted according to any one of MPEG, SVG, JPEG, GIF, PNG, SP-MIDI, XHTML, SMIL, and 3GP.

17. The non-transitory computer readable medium according to claim 11, wherein said identifiable scene description file is formatted according to any one of SMIL, HTML, XHTML, and SVG.

18. The non-transitory computer readable medium according to claim 11, wherein said multimedia container is configured for comprising different types of media objects in a transparent way, whereby the addressing, filenames, and MIMO types of the individual media objects are preserved.

19. The non-transitory computer readable medium according to claim 11, wherein said multimedia container further comprises a start location of said scene description file, said start location being a file path relative to a root level directory of said multimedia container.

20. A method performed at a multimedia presentation manager for transmitting a self-contained multimedia presentation comprising a plurality of media objects, said method comprising:

organizing the plurality of media objects in a multimedia container, said media objects comprising one or a combination of dynamic media objects in tracks and static media files;

organizing, in said multimedia container, identifiers referring to each of said plurality of media objects;

providing, in said multimedia container, an identifiable scene description file as a starting file for coordinating the plurality of media objects based on the said identifiers, to enable identification of a start of said multimedia presentation and the dependencies between said plurality of media objects of said multimedia presentation;

providing in said multimedia container, download control information comprising information regarding buffer delay based on a predetermined download speed to enable a receiver to render the identifiable scene description file and media objects of said multimedia container during transmission; and transmitting said multimedia container and the incorporated multimedia presentation, wherein said step of organizing, in said multimedia container, identifiers referring to each of said plurality of media objects comprises:

organizing and locating said identifiers referring to said dynamic media objects in a first section of said multimedia container; and organizing and locating said identifiers referring to said static media files in a second section of said multimedia container different from said first section, wherein said step of organizing said plurality of media objects in said multimedia container comprises organizing and locating said plurality of media objects in a third section of said multimedia container different from said first and second sections, and wherein said step of providing said scene description file comprises treating said scene description file as a static file and including said scene description file in said second section of said multimedia container.

21. The method according to claim 20, wherein said download control information comprises one or more pairs of combinations of transport bandwidth and initial download delay to enable obtaining an upper estimate of an initial download delay by linear interpolation.

22. The method according to claim 20, wherein said step of providing the scene description file comprises providing a start location of said scene description file, said start location being a file path relative to a root level directory of said multimedia container.

23. A multimedia presentation manager for transmitting a self-contained multimedia presentation as one unit, said presentation comprising a plurality of media objects, said multimedia presentation manager comprising:

means for organizing the plurality of media objects in a multimedia container, said media objects comprising one or a combination of dynamic media objects in tracks and static media files;

means for organizing, in said multimedia container, identifiers referring to each of said plurality of media objects;

means for providing, in said multimedia container, an identifiable scene description file as a starting file for coordinating the plurality of media objects based on the said identifiers, to enable identification of a start of said multimedia presentation and the dependencies between said plurality of media objects of said multimedia presentation;

means for providing in said multimedia container, download control information comprising information regarding buffer delay based on a predetermined download speed to enable a receiver to render the identifiable scene description file and media objects of said multimedia container during transmission; and means for transmitting said multimedia container and the incorporated multimedia presentation, thereby enabling display of the multimedia presentation directly from the transmitted multimedia container, wherein said means for organizing, in said multimedia container, identifiers referring to each of said plurality of media objects are adapted to organize and locate said identifiers referring to said dynamic media objects in a first section of said multimedia container, and organize and locate said identifiers referring to said static media files in a second section of said multimedia container different from said first section, wherein means for organizing said plurality of media objects in said multimedia container are adapted to organize and locate said plurality of media objects in a third section of said multimedia container different from said first and second sections, and wherein said means for providing said scene description file are adapted to treat said scene description file as a static file and to include said scene description file in said second section of said multimedia container.

24. The multimedia presentation manager according to claim 23, wherein said means for providing said download control information are adapted to provide the download control information comprises one or more pairs of combinations of transport bandwidth and initial download delay to enable obtaining an upper estimate of an initial download delay by linear interpolation.

25. The multimedia presentation manager according to claim 23, wherein said means for providing the scene description file are adapted to provide a start location of said scene description file, said start location being a file path relative to a root level directory of said multimedia container.

* * * * *

UNITED STATES PATENT AND TRADEMARK OFFICE
CERTIFICATE OF CORRECTION

| | | |
|---|---|---|
| PATENT NO. | : 7,979,886 B2 | Page 1 of 1 |
| APPLICATION NO. | : 10/963771 | |
| DATED | : July 12, 2011 | |
| INVENTOR(S) | : Frojdh et al. | |

It is certified that error appears in the above-identified patent and that said Letters Patent is hereby corrected as shown below:

In Column 2, Line 62, delete "FIG. 8;" and insert -- FIG. 8. --, therefor.

In Column 3, Line 33, delete "early" and insert -- carry --, therefor.

In Column 6, Line 4, delete "identifiers" and insert -- identifiers. --, therefor.

In Column 6, Line 43, delete "RI FP" and insert -- HTTP --, therefor.

In Column 6, Lines 49-50, delete "HTIP-delivery" and insert -- HTTP-delivery --, therefor.

In Column 7, Line 44, delete "Streaming-server" and insert -- Steaming-server --, therefor.

In Column 9, Line 49, delete "HTTP 1.1." and insert -- HTTP/1.1. --, therefor.

In Column 9, Line 51, delete "referred" and insert -- preferred --, therefor.

In Column 14, Line 49, delete "protection" and insert -- Protection --, therefor.

In Column 15, Line 18, in Table 14, delete "orginal" and insert -- original --, therefor.

In Column 16, Line 11, delete "18," and insert -- 18. --, therefor.

In Column 17, Line 20, delete "scheme." and insert -- scheme). --, therefor.

In Column 17, Line 29, delete "types" and insert -- types. --, therefor.

In Column 17, Line 30, delete "description" and insert -- description. --, therefor.

Signed and Sealed this
Tenth Day of April, 2012

David J. Kappos
*Director of the United States Patent and Trademark Office*